F. O. JAQUES, Jr.
GAGE.
APPLICATION FILED SEPT. 9, 1918.

1,292,792. Patented Jan. 28, 1919.

INVENTOR:
Fernando Oscar Jaques, Jr.,
By Chas. H. Luther
ATTORNEY

UNITED STATES PATENT OFFICE.

FERNANDO OSCAR JAQUES, JR., OF PROVIDENCE, RHODE ISLAND, ASSIGNOR TO THE CENTRAL TOOL COMPANY, OF CRANSTON, RHODE ISLAND, A CORPORATION OF RHODE ISLAND.

GAGE.

1,292,792.  Specification of Letters Patent.  Patented Jan. 28, 1919.

Application filed September 9, 1918. Serial No. 253,228.

*To all whom it may concern:*

Be it known that I, FERNANDO OSCAR JAQUES, Jr., a citizen of the United States, residing at Providence, in the county of Providence and State of Rhode Island, have invented a new and useful Improvement in Gages, of which the following is a specification.

One piece internal gages that are constructed to have an accuracy of one-thousandths of an inch are hardened to resist wear. Nevertheless in time they do wear, when their utility is destroyed and they are thrown away. This means a material loss, as the cost of such gages is considerable.

My invention has reference to an improvement in gages and more particularly to an improvement in internal gages used for interior gaging of cylinders, bores, etc.

The object of my invention is to improve the construction of an internal gage, whereby wear on the gage may be compensated for and the gage may be adjusted for wear an innumerable number of times, thereby producing a gage that will wear practically indefinitely.

My invention consists in the peculiar and novel construction of an internal gage in which hardened steel balls form the wearing surfaces, said gage having means for accurately holding the balls in place, means whereby the balls may be adjusted in position for wear, means for accurately and uniformly securing the balls in place after adjustment and details of construction as will be more fully set forth hereinafter and claimed.

Figure 1:
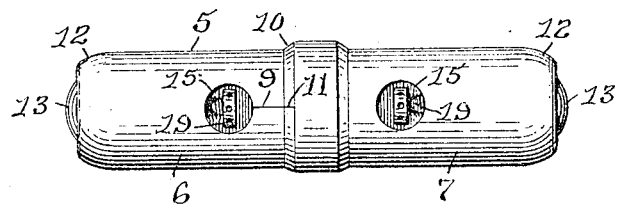
Figure 1 is a side view of my improved internal gage.
Figure 2:
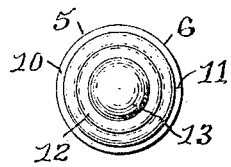
Fig. 2 is an end view of the gage.
Figure 3:
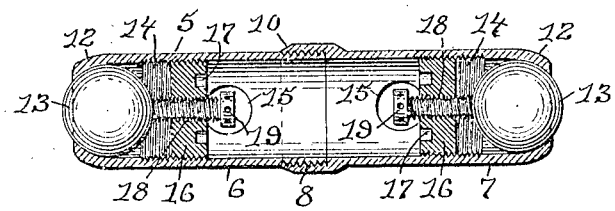
Fig. 3 is a longitudinal sectional view through the gage.
Figure 4:
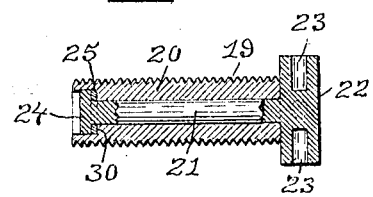
Fig. 4 is an enlarged longitudinal sectional view through one of the ball locking devices.

In the drawings 5 indicates the cylindrical body of the gage formed in two parts 6 and 7 and screwed together centrally at 8, the part 6 having an indicating line 9 on its surface adjacent the center of the gage and the part 7 having a beveled portion 10 on which is an indicating line 11, registering with the indicating line 9, when the parts of the body are accurately screwed together. Each part 6 and 7 of the body is constructed to have a partly closed end 12 shaped to hold a hardened steel ball 13 which protrudes a predetermined distance from the partly closed end 12. Each part 6 and 7 has also an internally screw-threaded portion 14 and a hole 15 in the side. An externally screw-threaded partitioning member 16 is screwed into each of the screw-threaded portions 14 14 and has the wrench holes 17 17 and a central screw-threaded hole 18. A ball locking device 19 consisting of an externally screw-threaded tube 20 which screws through the screw-threaded hole 18 in each partitioning member 16 and bears at its inner end against a ball 13 and a stem 21 which has a head 22 in which are the tool holes 23 23, said stem being frictionally secured in the tube 20 by upsetting the inner end 24 of the stem over a friction washer 25 which in turn bears against a shoulder 30 in the end of the tube 20, as shown in Fig. 4.

When assembled the gage is adjusted by turning the part 7 on the part 6 and actually set by the use of a standard gage. The indicating line 11 is then made on the beveled portion 10 to coincide with the indicating line 9 on the part 6. When it is necessary to take the gage apart for cleaning or other purposes, the parts may again be assembled and accurately set, by the use of the indicating lines 9 and 11 on the gage.

When in use, internal gages are tested from time to time by the use of an accurate standard gage. When under test it is found that the contact spot on a hardened steel ball 13 has worn so as to destroy the accuracy of the gage, the ball locking device 19 is loosened by a tool through a hole 15 in the gage engaging with a tool hole 23 in the head 22 of the device. The ball is then turned slightly so as to bring a new and accurate contact spot into place and the ball locking device tightened, and this may be repeated an innumerable number of times or as many times as there are contact spots on the surface of the ball. The frictional construction of the ball locking device 19 is such that, after each adjustment of a ball the contact pressure of the locking device on the ball, in locking the ball in place, is always the same, thereby retaining the accuracy of the gage. This gage may have an accuracy of one ten-thousandths of an inch or an even greater accuracy than that. When such great accuracy is not required, the ball locking device 19 may be dispensed with and the screw-threaded partitioning members 16 16 may be used for locking the balls in place.

Having thus described my invention I claim as new:

1. A gage having a separable tubular body, a ball in each end of the body and protruding from the body, means for holding the balls in the ends of the body and frictional means for locking the balls in place, whereby the balls may be turned in the ends of the body and locked in the new position.

2. A gage having a two part tubular body, a hardened steel ball in each end of the tubular body and protruding from the end of the body, means for securing the parts of the tubular body together, a ball locking device adjacent each ball in the tubular body and means for operating the ball locking device, whereby the balls may be adjusted for wear and locked in the adjusted position.

3. A gage having a two part tubular body screwed together centrally, each part having an indicating line on one side, a hole in one side, a partly closed end shaped to hold a ball, a hardened steel ball in and protruding from the end, an internally screw-threaded portion, a partition member screwed into the internally screw-threaded portion, and having wrench holes and a central screw-threaded hole, a ball locking device consisting of an externally screw-threaded tube in the central screw-threaded hole in the partitioning member said tube being provided with a shoulder and bearing at its inner end against said ball, a stem in the tube and having a head in which are tool holes, said stem being frictionally secured in the tube by an enlarged inner end and a friction washer intermediate the enlarged end and said shoulder in the tube.

In testimony whereof, I have signed my name to this specification.

FERNANDO OSCAR JAQUES, Jr.

Copies of this patent may be obtained for five cents each, by addressing the "Commissioner of Patents, Washington, D. C."